United States Patent [19]

Ochiai et al.

[11] Patent Number: 5,789,517
[45] Date of Patent: Aug. 4, 1998

[54] CONTINUOUS PRODUCTION METHOD OF POLYORGANOSILOXANE PARTICLES

[75] Inventors: Tetsunori Ochiai; Makoto Nishida; Mitsunori Iwasaki, all of Tokyo, Japan

[73] Assignee: Toshiba Silicone Co., Ltd., Tokyo, Japan

[21] Appl. No.: 721,239

[22] Filed: Sep. 26, 1996

[30] Foreign Application Priority Data

Sep. 28, 1995 [JP] Japan .................................. 7-251308

[51] Int. Cl.$^6$ .................................................. C08G 77/08
[52] U.S. Cl. .......................... 528/21; 528/10; 528/12; 528/13; 528/14; 524/837
[58] Field of Search .......................... 528/10, 21, 14, 528/13, 12; 524/837

[56] References Cited

U.S. PATENT DOCUMENTS 5,013,788  5/1991  Nagashima et al. ................. 524/493
5,296,569  3/1994  Noda et al. ........................... 525/479

FOREIGN PATENT DOCUMENTS

| 0481892 | 4/1992 | European Pat. Off. . |
| 0522776 | 1/1993 | European Pat. Off. . |
| 0657209 | 6/1995 | European Pat. Off. . |

OTHER PUBLICATIONS

Database WPI, Derwent Publications Ltd., AN 93-049211.

Primary Examiner—Melvyn I. Marquis
Attorney, Agent, or Firm—Sughrue, Mion, Zinn, Macpeak & Seas, PLLC

[57] ABSTRACT

A continuous production method of polyorganosiloxane particles by press-introducing an organoalkoxysilane into an aqueous phase such as water through a porous membrane to form a monodisperse O/W type emulsion and adding a catalyst to the emulsion to condensation polymerize the organoalkoxysilane. Non-porous polyorganosiloxane particles having a uniform particle size can be stably and continuously produced with a high efficiency.

8 Claims, 3 Drawing Sheets

CONTINUOUS PRODUCTION METHOD OF POLYORGANOSILOXANE PARTICLES

FIELD OF THE INVENTION

The present invention relates to a continuous production method of polyorganosiloxane particles, and more specifically to a method of producing non-porous polyorganosiloxane particles having a uniform particle size by press-introducing an organoalkoxysilane into an aqueous phase through a porous membrane and condensation polymerizing the organoalkoxysilane using a catalyst.

BACKGROUND OF THE INVENTION

Conventional production methods of polyorganosiloxane particles are a method of producing the particles by adding dropwise an alkoxysilane to an aqueous solution of a hydrolysis catalyst such as an alkaline compound, an acidic compound, etc., and stirring the mixture as described in, for example, JP-A-54-72300, JP-A-60-13813, JP-A-63-77940, JP-A-63-295637, JP-A-63-312324, JP-A-63-312325, JP-A-1-217039, and JP-A-2255837(the term "JP-A" as used herein means an "unexamined published Japanese patent application"), a method of grinding a polyorganosiloxane cured product with a ball mill, an atomizer, etc., as described in JP-A-61-194009, a method of dispersing a curable liquid polysiloxane in water and then curing the polysiloxane as described in JP-A-63-77942, etc.

However, since these production methods are batch-type production methods, there are problems that the productivity is low and that the particle size of polyorganosiloxane particles scatters in every batch. In particular, in the method described in JP-A-63-77940 described above, polymethylsilsesquioxane particles having substantially true spherical form are obtained. However, reaction is carried out at an interface while stirring in a double layer state of the layer of an alkoxysilane solution and the layer of a catalyst such as an aqueous ammonia solution, etc. Therefore, there is a problem that long time is required for the reaction. Further, there is a problem that the particle size scatters according to the stirring condition.

Conventional production method of inorganic microspheres is a method of obtaining inorganic microspheres by press-introducing a silicate of an alkali metal, such as water glass, etc., into an organic solvent such as a hexane solution of a emulsifying agent through a porous membrane to form a W/O type emulsion and then curing the emulsion using a catalyst such as an acid, a salt, etc., as described in, for example, JP-A-4-154605, and JP-A-5-240.

However, this method involves a problem that an organic solvent and a surface active agent are required for producing a W/O type emulsion and it is difficult to remove the surface active agent, etc., from the inorganic microspheres obtained, and also involves a problem that the inorganic microspheres obtained easily become porous and it is difficult to obtain non-porous microspheres.

SUMMARY OF THE INVENTION

The present invention has been made to overcome the conventional problems described above.

Accordingly, an object of the present invention is to provide a method of efficiently, stably, and continuously producing polyorganosiloxane particles which are non-porous and have a uniform particle size.

As a result of various investigations to overcome the problems in the conventional techniques, it has been found that in the production method of polyorganosiloxane particles by the hydrolysis and condensation polymerization reaction of an alkoxysilane, the organosiloxane is dispersed in an aqueous phase through a porous membrane to form an O/W type emulsion and a condensation polymerization is conducted by adding a catalyst to the emulsion, whereby non-porous polyorganosiloxane particles having a uniform particle size can be efficiently, stably, and continuously produced. The present invention has been attained based on this finding.

According to the present invention, there is provided a continuous production method of polyorganosiloxane particles, comprising a step of forming a monodisperse O/W type emulsion by press-introducing an organoalkoxysilane into an aqueous phase through a porous membrane, and a step of adding a catalyst to the emulsion to condensation polymerize the organoalkoxysilane.

DETAILED DESCRIPTION OF THE INVENTION

Figure 1:
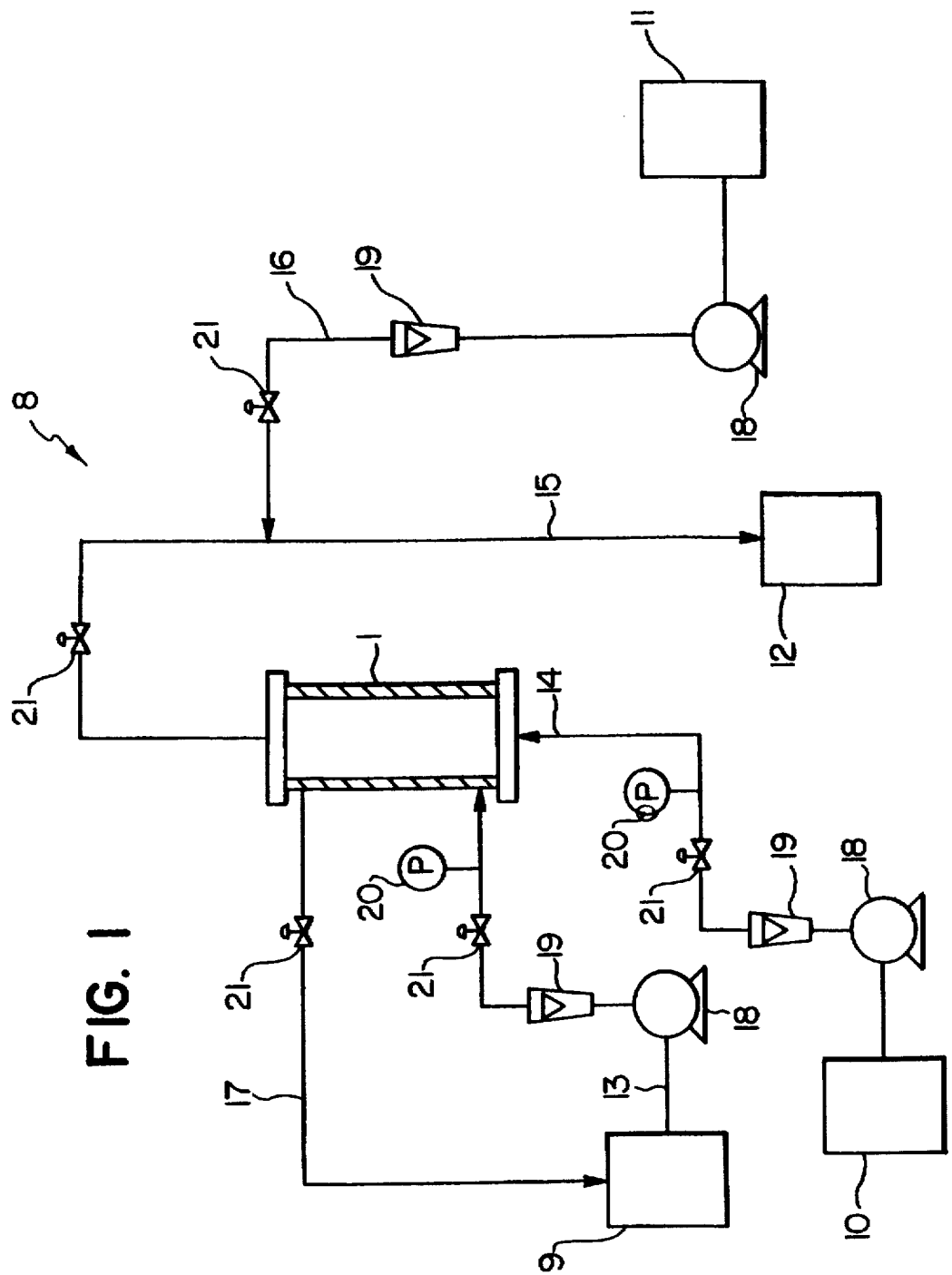
FIG. 1 is a view showing one example of the apparatus used in the method of the present invention.

The present invention is described in detail below.

Example of the organoalkoxysilane used in the present invention is a silane represented by following formula (I). Partially hydrolyzed product of the silane may also be used.

$$R_n SiX_{4-n} \qquad (I)$$

wherein R represents a substituted or unsubstituted monovalent organic group; X represents an alkoxy group; and n represents 0 or an integer of from 1 to 3.

Examples of the monovalent organic group represented by R are an alkyl group such as methyl, ethyl, propyl, butyl, pentyl, hexyl, octyl, decyl, dodecyl, or octadecyl; a cycloalkyl group such as cyclopentyl, or cyclohexyl; an alkenyl group such as vinyl, or allyl; an aralkyl group such as 2-phenylethyl, or 2-phenylpropyl; an aryl group such as phenyl, or tolyl; and the above groups each substituted with an epoxy group, a glycidoxy group, an amino group, an acryl group, a methacryl group, an acryloxy group, a methacryloxy group, an alkoxy group, a hydroxyl group, a carboxyl group, a fluoroalkyl group, etc.

In these groups, an alkyl group and an aryl group are preferred, and a methyl group is more preferred from that nonporous polyorganosiloxane particles having a uniform particle size are obtained.

Examples of the alkoxy group represented by X are methoxy, ethoxy, propoxy, butoxy, phenoxy, methoxyethoxy, and methoxypropoxy. In these alkoxy groups, a methoxy group and an ethoxy group are preferred from the point that it is easy to control the reaction of hydrolysis and condensation polymerization.

In the above formula (I), n is 0 or an integer of from 1 to 3. The organoalkoxysilane in the present invention is that the silanes each having a different value of n can be used together as, for example, a mixture of an alkyltrialkoxysilane and a dialkyldialkoxysilane. It is preferred to use the silanes wherein n is from 1 to 3 from the point that non-porous polyorganosiloxane particles are easily obtained. In this case, it is preferred to use at least 70 mol % of the silane wherein n is 1. In particular, in view of the fact that the polyorganosiloxane particles having a uniform particle size are obtained in the continuous production method of polyorganosiloxane particles of the present invention, it is preferred to obtain the polymethylsilsesquioxane particles by using only the silane wherein n is 1.

Two or more kinds of alkoxysilanes wherein the organic group R and the alkoxy group X differ each other may also be used.

The organoalkoxysilane is used in an amount such that the amount is from 5 to 50% by weight, and preferably from 10 to 30% by weight, based on the weight of the emulsion obtained by press-introducing the organoalkoxysilane into an aqueous phase, from the points that the silane particles which are suspended fine particles are difficult to aggregate and spherical particles having a uniform particle size are obtained.

Any catalyst which can hydrolyze and condensation polymerize the alkoxysilane may be used as the catalyst. Examples of the catalyst are ammonia; amines such as monomethylamine, dimethylamine, monoethylamine, diethylamine, or ethylenediamine; alkali metal hydroxide such as sodium hydroxide, potassium hydroxide, lithium hydroxide, or barium hydroxide; alkali metal carbonates such as sodium carbonate, or potassium carbonate; inorganic acids such as hydrochloric acid, sulfuric acid, or phosphoric acid; and organic acids such as formic acid, acetic acid, propionic acid, monochloroacetic acid, oxalic acid, or citric acid. In these catalysts, ammonia, amines, alkali metal hydroxides, and alkali metal carbonates are preferably used from the point that the polymerization of the alkoxysilane is carried out well, and ammonia and amines are particularly preferred from that the polyorganosiloxane particles having small impurities are easily obtained.

In the present invention, it is preferred to use the catalyst as the aqueous solution thereof. To proceed well the hydrolysis and condensation polymerization, it is preferred to use the aqueous solution of the catalyst as the solution of the catalyst further containing an organic solvent, if necessary. Examples of the organic solvent which is added to the aqueous solution of the catalyst are hydrophilic organic solvents, for example, alcohols such as methanol, ethanol, propyl alcohol, nbutanol, or iso-butanol; and ketones such as dimethyl ketone, methyl ethyl ketone, or acetone.

The amount of the organic solvent used is preferably 20% by weight or less, and more preferred 10% by weight or less, based on the total weight of water and the organic solvent from the point that the polyorganosiloxane particles having a uniform particle size are obtained.

The amount of the catalyst used is preferably from 0.001 to 5.0% by weight, and more preferably from 0.1 to 2.0% by weight, as the amount in the state of adding the solution of the catalyst to the emulsion of the alkoxysilane from the points that hydrolysis and condensation polymerization reaction of the alkoxysilane are carried out well and the polyorganosiloxane particles containing small impurities are obtained.

The porous membrane used in the present invention is a porous membrane having a pore diameter of from 80 to 50,000 Å, and preferably from 1,000 to 15,000 Å. Porous membranes made of various kinds of materials can also be used. Examples of such porous membranes are a ceramic membrane, a glass membrane, an organic high molecular weight membrane, and a composite membrane of the above materials.

In these membranes, a ceramic membrane and a glass membrane are preferred from the point that the heat resistance, the durability, etc., are excellent. Examples of the material of the ceramic membrane are silicic materials such as silica, or silica lime; and non-silicic materials such as alumina, nickel oxide, or titanite. Of these materials, alumina is preferred.

Further, the form and the characteristics of the pores of these porous membranes may be such that pores are uniformly and independently dotted and have almost the same pore diameter or the pores have a network structure as an agarose gel. The pores which are uniformly and independently dotted and have almost the same pore diameter are preferred from the point that a monodisperse emulsion having fine particle size is obtained well.

The porous membrane used in the present invention preferably is subjected to a hydrophobic treatment since the press-introduction of the organoalkoxysilane into an aqueous phase is particularly improved, a monodisperse emulsion is formed, the durability of a filter is increased and the maintenance thereof becomes easy. The hydrophobic treatment can be carried out by a conventional method using a treating agent such as an alkylchlorosilane, an alkylalkoxysilane, a fluoroalkylalkoxysilane, or a silicone resin. For example, the treating agent is dissolved in an organic solvent and, if necessary, a curing catalyst of the treating agent, such as an organotin compound, or an organotitanium compound, is compounded with the solution to obtain a treating liquid. The porous membrane is then immersed in the treating liquid and they are allowed to stand at room temperature or heated to cure the treating agent, whereby the hydrophobic treatment is carried out. In other method, the treating agent such as silane is vaporized by heating and the hydrophobic treatment can be carried out by passing the gaseous treating agent through the porous membrane and, if necessary, further carrying out a plasma polymerization.

In the point that the porous membrane can be easily washed with an acid, an alkali, etc., it is preferred to use a hydrophilic porous membrane without being subjected to the hydrophobic treatment. This has the characteristic that the largish particles are easily obtained.

Figure 3:
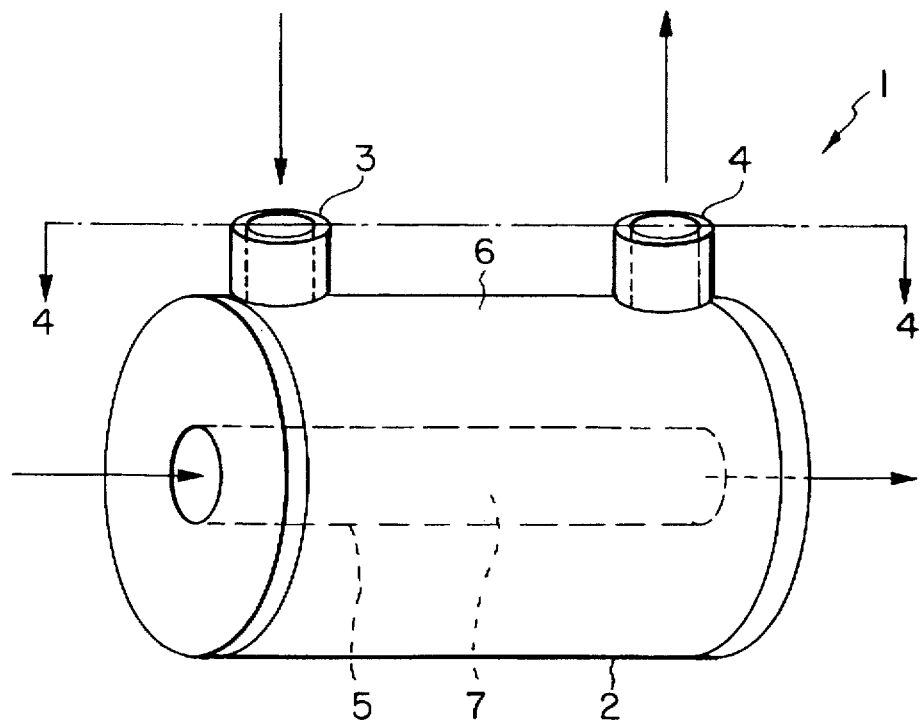
FIG. 3 is a slant view showing one example of a filter used in the present invention.
Figure 4:
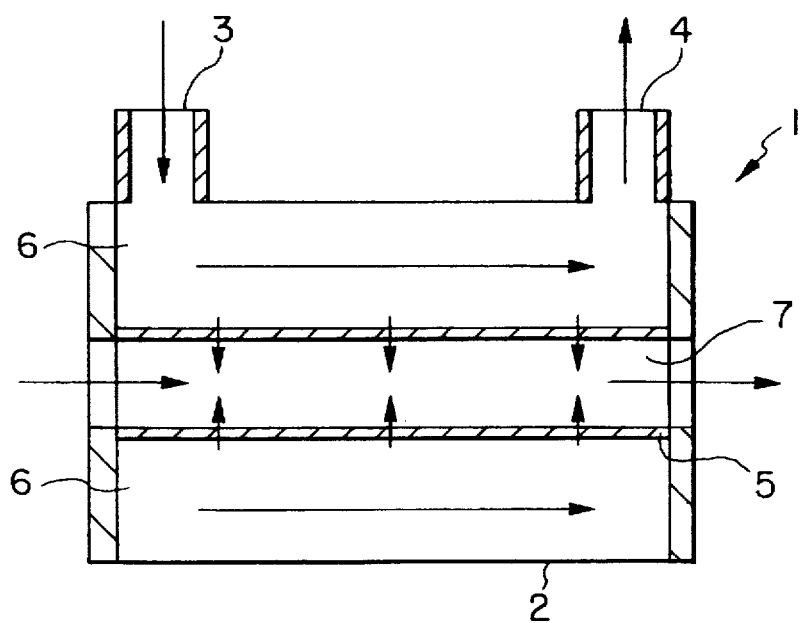
FIG. 4 is a sectional view cut along the line A-B of the filter in FIG. 3.

Example of the porous membrane used in the present invention is a hollow tubular porous membrane. The filter using the hollow tubular porous membrane preferably has a form that an aqueous phase can be passed in the hollow portion (inside) of the tubular porous membrane and the organoalkoxysilane can be press-introduced in the aqueous phase from the outside. One example of such a filter is shown in FIG. 3 and FIG. 4. In each drawing thereof, the same numerals are used for the same parts of the constitution.

In FIG. 3 and FIG. 4, a filter 1 has a liquid inlet 3 and a liquid outlet 4 at an outer tube portion 2, and a hollow tubular porous membrane 5 is disposed in the inside of the filter. Space between the inside wall of the outer tube portion 2 and the outer surface of the tubular porous membrane 5 forms a liquid supplying passageway 6.

Accordingly, in the filter 1, an organoalkoxysilane is introduced therein from the liquid inlet 3 and while the organoalkoxysilane introduced passes through the liquid supplying passageway 6, the organoalkoxysilane is pressintroduced in an aqueous phase which is passed through a hollow portion 7 of the tubular porous membrane 5 to form an emulsion. The organoalkoxysilane which was not press-introduced in the aqueous phase is discharged from the liquid outlet 4 into the outside.

A filter having a plurality of hollow portions through which an aqueous phase is passed can also be used in the present invention. Further, the organoalkoxysilane may be press-introduced into the aqueous phase from the hollow portion (inside) of the hollow tubular porous membrane by passing an aqueous phase through the space formed between the outer tube portion of the filter and the tubular porous membrane. A filter having the form that an aqueous phase is passed through the hollow portion (inside) of the hollow tubular porous membrane and the organoalkoxysilane can be press-introduced in the aqueous phase from the outside of the tubular porous membrane is preferred from the point that the pressure and the flow rate can be easily controlled.

An example of the apparatus used in the present invention is shown in FIG. 1.

In FIG. 1, an apparatus 8 is constituted by the filter 1 shown in FIG. 3 and FIG. 4, a tank 9 for an organoalkoxysilane, an aqueous phase tank 10, a catalyst tank 11, and a product tank 12. These constituents are connected by lines 13 to 17. A liquid supply pump 18, a flow meter 19, a pressure gage 20, and a valve 21 are properly disposed in each line. A heater (not shown) is also equipped to each line for controlling each line to a desired temperature.

In the apparatus thus constituted, an aqueous phase is passed from the aqueous phase tank 10 into the hollow portion 7 of the filter 1 at a definite flow rate and a definite pressure. Further, an organoalkoxysilane is passed through the liquid supplying passageway 6 of the filter 1 from the organoalkoxysilane tank 9 at a definite flow rate and a definite pressure higher than the pressure of the aqueous phase.

Thus, the organoalkoxysilane is press-introduced in the aqueous phase through the porous membrane 5, and the emulsion of the organoalkoxysilane is formed in the aqueous phase. An aqueous solution of a catalyst from the catalyst tank 11 is introduced into the emulsion to cure (condensation polymerize) the organoalkoxysilane fine particles (suspended fine particles) in the emulsion. The product obtained is stored in the product tank 12.

The product is, if necessary, isolated through the steps of a filtration, water washing, dehydration by, for example, a centrifugal separation, drying, grinding, etc.

The production method of the present invention has the characteristic that since it is not necessary to use a surface active agent, water washing, dehydration, etc., of the product can be carried out well, becoming easy to isolate the product.

Figure 2:
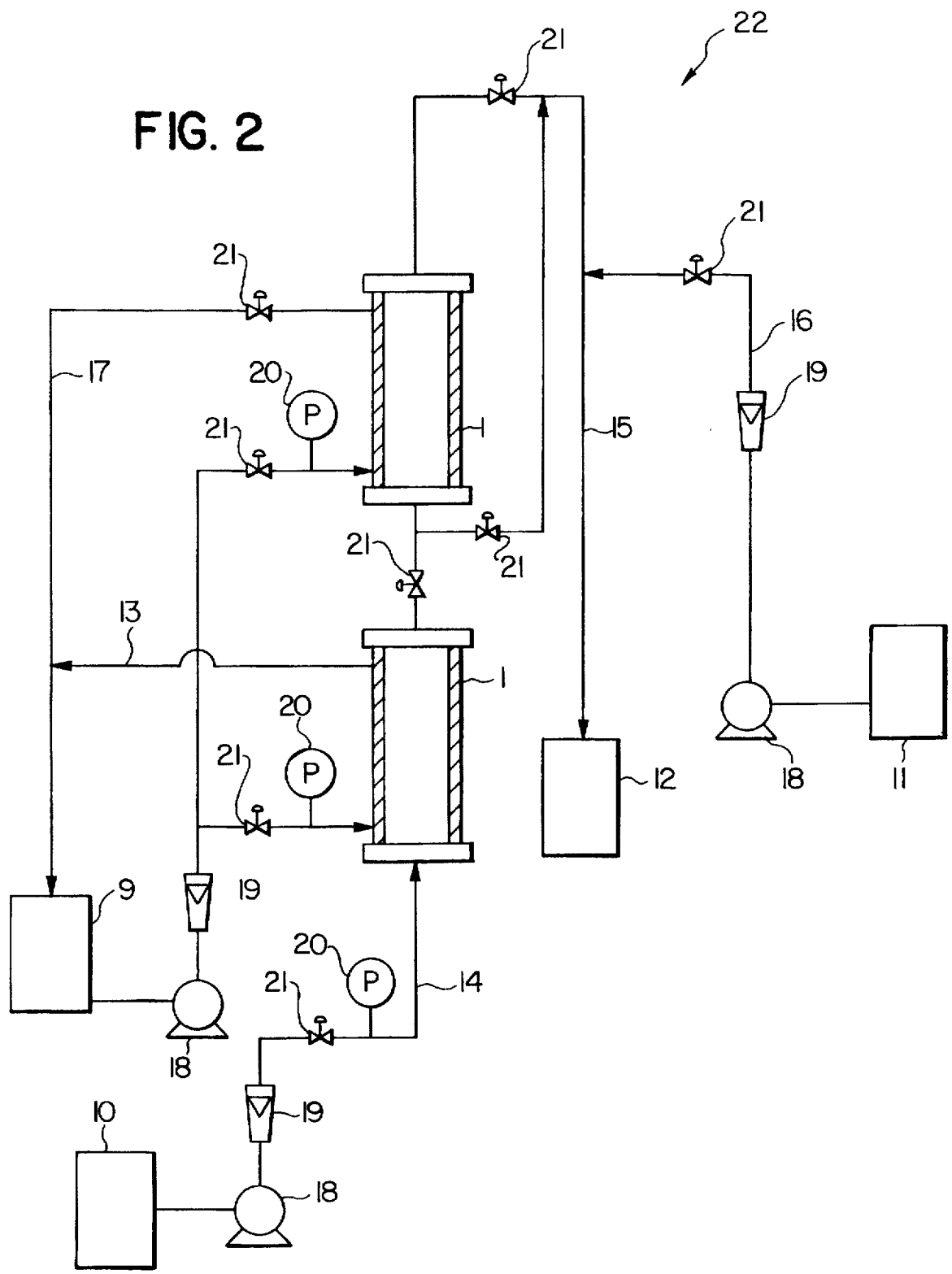
FIG. 2 is a view showing another example of the apparatus used in the present invention.

An apparatus 22 using a combination of a plurality of filers 1,1 as shown in FIG. 2 may be used as the apparatus used in the present invention. The combination of the filters 1,1 may be such that the filters are disposed parallel to the stream of the aqueous phase. Various combinations are possible. To accelerate curing by the hydrolysis and condensation polymerization of the silane after introduction of the catalyst, a heating apparatus such as a heater may be disposed in each line.

In the present invention , in view of the fact that suspended fine particles having good particle size are obtained in the emulsion where an emulsion is formed by passing an organoalkoxysilane through the porous membrane and where a catalyst is added, it is preferred to control the temperatures of the aqueous phase, the organoalkoxysilane, and emulsion to a temperature of from 0° C. to 80° C., and preferably from 10° C. to 20° C., at the formation of the emulsion. After addition of the catalyst, to proceed well the hydrolysis and condensation polymerization reaction, it is preferred to control the temperature of the emulsion to a temperature of from 30° C. to 60° C., and preferably from 40° C. to 50° C.

The present invention is described in more detail by referring to the following examples. Unless otherwise indicated, all parts and percentages in these examples are by weight, and the viscosities show the values at 25° C.

EXAMPLE 1

Using the apparatus shown in FIG. 1, condensation polymerization of an organoalkoxysilane was continuously carried out under the following conditions.

Water was used as an aqueous phase, methyltrimethoxysilane was used as an organoalkoxysilane, and 25% aqueous ammonia was used as a catalyst. Flow rate of silane was shown by the amount which enters into the aqueous phase by press-introducing from the liquid supplying passageway 6 of the filter 1, and flow rate of a catalyst was shown by the amount which enters into the emulsion. A hollow tubular form made of alumina was used as the porous membrane 5. The temperature at press-introducing the silane into the aqueous phase and also at the addition of the catalyst was controlled to a temperature of from 15° C. to 25° C., and the temperature after addition of the catalyst was controlled to a temperature of from 30° C. to 40° C.

The conditions in the filter 1 are shown below.
Average pore size of the porous membrane 5: 5,000 Å
Inside diameter of tubular porous member 5: 10 mm
Thickness of the porous membrane 5: 1 mm
Length of the porous membrane 5: 500 mm
Inside diameter of the filter 1: 30 mm
Flow rate of water: 300 kg/hour
Flow rate of the silane: 30 kg/hour
Flow rate of the catalyst: 5.9 kg/hour When the product (dispersion) thus produced was discharged through a 150 mesh wire gauze and dehydration was carried out by a centrifugal filtration and a pressure filtration (filter press), a pasty product was obtained. The product obtained was dried in an oven and then ground using a Laboratory Jet Mill to obtain a white powder.

When the polyorganosiloxane particles thus obtained were observed by an electron microscope, the particles were non-porous and were substantially true spherical polyorganosiloxane particles having the ratio of the X-axis to the Y-axis in the particle size of from 1.0 to 1.2. The average particle size of the polyorganosiloxane particles was 2.2 µm (particle size distribution range: 1.8 to 2.6).

EXAMPLE 2

Condensation polymerization of the organoalkoxysilane was continuously carried out under the same conditions as in Example 1 except that an apparatus shown in FIG. 2 using two filters was used.

When the polyorganosiloxane particles thus obtained were observed by an electron microscope, the particles were nonporous and were substantially true spherical particles having the ratio of the X-axis to Y-axis in the particle size of from 1.0 to 1.2. The average particle size was 1.5 µm (particle size distribution range: 1.3 to 1.7).

EXAMPLE 3

Condensation polymerization of the organoalkoxysilane was continuously carried out under the same conditions as in Example 1 except that a porous membrane 5 having an average pore size of 15,000 Å was used.

When the polyorganosiloxane particles thus obtained were observed by an electron microscope, the particles were non-porous and were substantially true spherical polyorganosiloxane particles having the ratio of the X-axis to Y-axis in the particle size of from 1.0 to 1.1. The average particle size was 5.5 μm (particle size distribution range: 4.2 to 6.8).

EXAMPLE 4

Condensation polymerization of the organoalkoxysilane was continuously carried out under the same conditions as in Example 1 except that a porous membrane 5 having an average pore size of 1,000 Å was used.

When the polyorganosiloxane particles thus obtained were observed by an electron microscope, the particles were non-porous and were substantially true spherical polyorganosiloxane particles having the ratio of the X-axis to Y-axis in the particle size of from 1.0 to 1.2. The average particle size was 0.50 μm (particle size distribution range: 0.45 to 0.55).

EXAMPLE 5

Condensation polymerization of the organoalkoxysilane was continuously carried out under the same conditions as in Example 1 except that a mixture of methyltrimethoxysilane and dimethylmethoxysilane (4:1 by molar ratio) was used as the organoalkoxysilane.

When the polyorganosiloxane particles thus obtained were observed by an electron microscope, the particles were non-porous and were substantially true spherical polyorganosiloxane particles having the ratio of the X-axis to Y-axis in the particle size of from 1.0 to 1.42. The average particle size was 2.5 μm (particle size distribution range: 1.7 to 3.3).

EXAMPLE 6

Condensation polymerization of the organoalkoxysilane was continuously carried out under the same conditions as in Example 1 except that an aqueous solution (containing 8% ethanol) of 25% dimethylamine was used as the catalyst.

When the polyorganosiloxane particles thus obtained were observed by an electron microscope, the particles were non-porous and were substantially true spherical polyorganosiloxane particles having the ratio of the X-axis to Y-axis in the particle size of from 1.0 to 1.2. The average particle size was 2.2 μm (particle size distribution range: 1.8 to 2.6).

EXAMPLE 7

Condensation polymerization of the organoalkoxysilane was continuously carried out under the same conditions as in Example 1 except that the porous membrane 5 which had been subjected to a hydrophobic treatment with trimethylmethoxysilane was used. The hydrophobic treatment was carried out by immersing the porous membrane 5 in a 20% toluene solution (containing 0.1% dibutyltin dilaurate) of trimethylmethoxysilane, air drying the membrane thus treated, and heating the same at 50° C. for one hour.

When the polyorganosiloxane particles thus obtained were observed by an electron microscope, the particles were non-porous and were substantially true spherical polyorganosiloxane particles having the ratio of the X-axis to Y-axis in the particle size of from 1.0 to 1.1. The average particle size was 1.8 μm (particle size distribution range: 1.6 to 2.0).

Comparative Example 1

Condensation polymerization of the organoalkoxysilane was continuously carried out under the same conditions as in Example 1 except that toluene (containing 10% polyoxyethylene(20) lauryl ether) was used as the aqueous phase and an equivalent weight mixture of a 25% aqueous ammonia and 100% ethanol was used as the catalyst.

However, particles were not formed and only a viscous liquid was obtained.

Comparative Example 2

Condensation polymerization of the organoalkoxysilane was continuously carried out under the same conditions as in Example 1 except that a partially hydrolyzed product of tetraethoxysilane was used as the organoalkoxysilane, hexane (containing 10% polyoxyethylene(20) lauryl ether) was used as the aqueous phase and an equivalent weight mixture of a 25% aqueous ammonia and 100% ethanol was used as the catalyst.

When the polyorganosiloxane particles thus obtained were observed by an electron microscope, the particles were porous and were spherical polyorganosiloxane particles having the ratio of X-axis to the Y-axis in the particle size was 1.0 to 1.5. The average particle size was 3.5 μm (particle size distribution range: 0.8 to 8.5).

As described above, according to the present invention, a monodisperse emulsion wherein organosiloxane particles (suspended fine particles) are spherical and have a uniform size is formed by press-introducing an organosiloxane into an aqueous phase through a porous membrane, and spherical polyorganosiloxane particles having a uniform particle size, which can hitherto been obtained by only a batch system, can be continuously produced with a good efficiency by adding a catalyst to the emulsion obtained to carry out the condensation polymerization of the organosiloxane. Also, the polyorganosiloxane particles obtained are non-porous. Further, since use of a surface active agent is not necessary in producing the polyorganosiloxane particles, the polyorganosiloxane particles produced can easily be purified and isolated.

While the invention has been described in detail and with reference to specific embodiments thereof, it will be apparent to one skilled in the art that various changes and modifications can be made therein without departing from the spirit and scope thereof.

What is claimed is:

1. A continuous production method of polyorganosiloxane particles, which comprises the steps of:

a) introducing an organoalkoxysilane into an aqueous phase by pressing said organoalkoxysilane through a porous membrane to form an oil-in-water emulsion having a uniform particle size; and b) adding a catalyst selected from the group consisting of amines, alkali metal hydroxides, alkali metal carbonates, inorganic acids, organic acids, and ammonia to said emulsion to condensation polymerize the organoalkoxysilane.

2. The continuous production method of polyorganosiloxane particles of claim 1, wherein the organoalkoxysilane is a silane represented by following formula (I) or a partially hydrolyzed product thereof;

$$R_nSiX_{4-n} \qquad (I)$$

wherein R represents a substituted or unsubstituted monovalent organic group; X represents an alkoxy group; and n represents 0 or an integer of from 1 to 3.

3. The continuous production method of polyorganosiloxane particles of claim 1, wherein the catalyst is an aqueous ammonia or an aqueous solution of said amine.

4. The continuous production method of polyorganosiloxane particles of claim 1, wherein the porous membrane is a hollow tubular ceramic membrane, and the organoalkoxysilane is press-introduced from the outside of the hollow tubular ceramic membrane into the aqueous phase in the hollow portion of the hollow tubular ceramic membrane.

5. A continuous production method of polyorganosiloxane particles, which comprises the steps of:
   a) applying a hydrophobic treatment to a porous membrane by dissolving a treating agent in an organic solvent to obtain a treating liquid and immersing the porous membrane in the treating liquid;
   b) introducing an organoalkoxysilane into an aqueous phase by pressing said organoalkoxysilane through the porous membrane to form an oil-in-water emulsion having a uniform particle size; and
   c) adding a catalyst selected from the group consisting of amines, alkali metal hydroxides, alkali metal carbonates, inorganic acids, organic acids, and ammonia to said emulsion to condensation polymerize the organoalkoxysilane.

6. The continuous production method of polyorganosiloxane particles of claim 5 wherein the porous membrane is a hollow tubular ceramic membrane and the organoalkoxysilane is pressed from the outside of the hollow tubular ceramic membrane into the aqueous phase in the hollow portion of the hollow tubular ceramic membrane.

7. A continuous production method of polyorganosiloxane particles, which comprises the steps of:
   a) applying a hydrophobic treatment to a porous membrane by dissolving a treating agent in an organic solvent to obtain a treating liquid, immersing the porous membrane in said treating liquid and curing the treating agent;
   b) introducing an organoalkoxysilane into an aqueous phase by pressing said organoalkoxysilane through the porous membrane to form an oil-in-water emulsion having a uniform particle size; and
   c) adding a catalyst selected from the group consisting of amines, alkali metal hydroxides, alkali metal carbonates, inorganic acids, organic acids, and ammonia to said emulsion to condensation polymerize the organoalkoxysilane.

8. The continuous production method of polyorganosiloxane particles of claim 7 wherein the porous membrane is a hollow tubular ceramic membrane and the organoalkoxysilane is pressed from the outside of the hollow tubular ceramic membrane into the aqueous phase in the hollow portion of the hollow tubular ceramic membrane.

* * * * *